(12) United States Patent  (10) Patent No.: US 7,037,472 B2
Komiya et al.  (45) Date of Patent: May 2, 2006

(54) SINGLE-PIPE CYLINDER-TYPE REFORMER

(75) Inventors: Jun Komiya, Tokyo (JP); Toshiyasu Miura, Tokyo (JP)

(73) Assignee: Tokyo Gas Co., Ltd., Tokyo (JP)

( * ) Notice: Subject to any disclaimer, the term of this patent is extended or adjusted under 35 U.S.C. 154(b) by 386 days.

(21) Appl. No.: 09/969,718

(22) Filed: Oct. 1, 2001

(65) Prior Publication Data

US 2002/0042035 A1 Apr. 11, 2002

(30) Foreign Application Priority Data

Oct. 10, 2000 (JP) .............................. 2000-308675

(51) Int. Cl.
B01J 8/06 (2006.01)
(52) U.S. Cl. ...................... 422/197; 422/204; 422/211; 48/127.9
(58) Field of Classification Search ........ 422/188–191, 422/193, 196–198, 201–206, 211, 222, 228, 422/229, 236; 48/63, 64, 102 R, 107, 102 A, 48/94, 95, 127.9, 128
See application file for complete search history.

(56) References Cited

U.S. PATENT DOCUMENTS

| | | | | |
|---|---|---|---|---|
| 1,478,550 A | * | 12/1923 | Casale | 422/148 |
| 3,541,729 A | * | 11/1970 | Dantowitz | 48/94 |
| 4,236,899 A | * | 12/1980 | Gulden et al. | 48/89 |
| 4,692,306 A | * | 9/1987 | Minet et al. | 422/49 |
| 4,847,051 A | * | 7/1989 | Parenti, Jr. | 422/202 |
| 4,909,808 A | * | 3/1990 | Voecks | 48/94 |
| 5,164,163 A | * | 11/1992 | Aoki et al. | 422/190 |
| 5,226,928 A | * | 7/1993 | Makabe et al. | 48/94 |
| 5,326,537 A | * | 7/1994 | Cleary | 422/173 |
| 6,117,578 A | * | 9/2000 | Lesieur | 429/19 |
| 6,126,908 A | * | 10/2000 | Clawson et al. | 422/190 |
| 6,413,479 B1 | * | 7/2002 | Kudo et al. | 422/198 |
| 6,481,207 B1 | * | 11/2002 | Miura et al. | 60/670 |

FOREIGN PATENT DOCUMENTS

| | | | |
|---|---|---|---|
| EP | 0922666 A1 | | 6/1999 |
| GB | 2 201 903 A | * | 9/1988 |
| JP | 7-291603 | * | 11/1995 |
| JP | 11-11901 | | 1/1999 |
| JP | 2000-128505 | * | 5/2000 |
| JP | 2000126505 A | | 5/2000 |
| WO | WO 98/08771 A2 | * | 3/1998 |
| WO | WO 00/63114 A1 | | 10/2000 |

* cited by examiner

Primary Examiner—Kevin P. Kerns
(74) Attorney, Agent, or Firm—Townsend and Townsend and Crew LLP

(57) ABSTRACT

A single-pipe cylinder-type reformer includes a plurality of circular cylinders standing upright coaxially and forming therebetween a zigzag gas flow path allowing a raw material gas to flow therein, a radiation cylinder coaxially arranged inside the plurality of circular cylinders, a burner arranged at one end of a center of the radiation cylinder for generating a combustion gas, a reforming catalyst layer obtained by packing with a reforming catalyst at least a first gas flow path section of the gas flow path closest to the burner. A metal pre-heat layer formed on an upstream side of the reforming catalyst layer is packed with a metal packing. Helical dividing means are provided in each gas flow path section of the gas flow path to extend in the axial direction of the circular cylinders. The helical dividing means helically divide a gas and make it flow through the first gas flow section.

20 Claims, 3 Drawing Sheets

SINGLE-PIPE CYLINDER-TYPE REFORMER

BACKGROUND OF THE INVENTION

1. Field of the Invention

The present invention relates to a single-pipe cylinder-type reformer for manufacturing a hydrogen-rich reformed gas by steam-reforming a hydrocarbon-based fuel such as a city gas or LPG and, more particularly, to a reformer used in a solid-state polymer-type fuel cell.

2. Description of the Prior Art

A reformer is an apparatus for generating a reformed gas with a high hydrogen concentration by steam-reforming a raw material gas such as a city gas or LPG, and is widely used when manufacturing hydrogen used in an optical fiber or semiconductor manufacturing process, a fuel cell and the like.

The steam-reforming reaction performed by a reformer is an endothermic reaction, and accordingly heating is needed to sustain the reaction. Usually, a combustor such as a burner is added to the reformer, and excessive hydrogen or reformed raw material gas from a fuel cell is heated by combusting it with the burner. As a reformer for manufacturing a comparatively small volume of hydrogen, for example, a single-pipe cylinder-type reformer as disclosed in Japanese Unexamined Patent Publication No. 11-11901 is known. In this single-pipe cylinder-type reformer, a heating means such as a burner is provided at the center of a cylindrical container comprised of two cylinders with a catalyst layer being stored between them. The catalyst layer is heated by the heating means, and a raw material gas supplied to the catalyst layer is reformed by steam.

The present applicant has previously filed an application for a single-pipe cylinder-type reformer, a fuel cell using the same, and an operating method for the reformer as shown in International Publication No. WO00/63114.

When a solid-state polymer-type fuel cell is to be used in a home or in an automobile, the entire reforming device including the single-pipe cylinder-type reformer must be made compact and lightweight. Also, various types of improvements must be made; e.g. higher-efficiency operation must be realized and the start-up time at the start of operation must be shortened.

For example, the raw material gas must be efficiently pre-heated to reduce the fuel. Overheating of the steam generator must be prevented to make the reformer more convenient to use. The reformer must be held at the necessary temperature and the quantity of heat must be effectively utilized to improve efficiency. External heat dissipation must be suppressed by an effective heat insulating structure. Thermal stress caused by an internal temperature difference must be moderated to realize a high durability. The heat of reaction must be effectively utilized to generate steam efficiently. An operating method that can efficiently cope with a change in operating state is sought.

The reformed gas generated by the conventional single-pipe cylinder-type reformer contains about 10% of CO. When this reformed gas is to be used as the fuel for a solid-state polymer-type fuel cell, the CO concentration must be decreased to about 0.5% by a CO modifier, and CO selective oxidation must be performed by a CO selective oxidizer, so the CO concentration decreases to about 10 ppm. However, providing a CO modifier and a CO selective oxidizer for this purpose independently of the single-pipe cylinder-type reformer is not preferable in terms of downsizing, high efficiency, and start-up performance.

In the single-pipe cylinder-type reformer disclosed in International Publication No. WO00/63114, too much heat is radiated to the outside, and heat is not appropriately supplied to and discharged from the respective portions.

SUMMARY OF THE INVENTION

The present invention has been made in consideration of the above problems in the prior art, has as an object to provide a single-pipe cylinder-type reformer which can generate a reformed gas with a low CO concentration, has an efficient, good start-up performance, realizes reduction in size and weight and does not emit excessive heat.

In order to achieve the above object, according to the first aspect of the present invention, there is provided a single-pipe cylinder-type reformer including a plurality of circular cylinders standing upright coaxially and forming therebetween a gas flow path allowing a raw material gas to flow therein and having a plurality of gas flow path sections, each being disposed between every pair of adjacent circular cylinders and having an annular cross-section, a radiation cylinder coaxially arranged inside the plurality of circular cylinders and forming at an outer periphery thereof an exhaust flow path, a burner arranged at one end of a center of the radiation cylinder for generating a combustion gas allowed to flow within the exhaust flow path in the reverse direction to the flowing direction of the raw material gas in a first gas flow path section, a reforming catalyst layer obtained by packing with a reforming catalyst into at least the first gas flow path section closest to the burner among the plurality of gas flow path sections, in which the raw material gas is reformed by making use of only steam, comprising a metal pre-heat layer packed with a metal packing at an upstream end of the reforming catalyst layer.

In order to achieve the above object, according to the second aspect of the present invention, there is provided a single-pipe cylinder-type reformer including a plurality of circular cylinders standing upright coaxially and forming therebetween a gas flow path allowing a raw material gas to flow therein and having a plurality of gas flow path sections, each being disposed between every pair of adjacent circular cylinders and having an annular cross-section, a radiation cylinder coaxially arranged inside the plurality of circular cylinders and forming at an outer periphery thereof an exhaust flow path, a burner arranged at one end of a center of the radiation cylinder for generating a combustion gas allowed to flow within the exhaust flow path in the reverse direction to the flowing direction of the raw material gas in a first gas flow path section, a reforming catalyst layer obtained by packing with a reforming catalyst into at least the first gas flow path section closest to the burner among the plurality of gas flow path sections, in which the raw material gas is reformed by making use of only steam, comprising a metal pre-heat layer packed with a metal packing at an upstream end of the reforming catalyst layer and helical dividing means extending in the first gas flow path section in an axial direction of the circular cylinders for helically dividing a gas and making it flow through the first gas flow path section.

In order to achieve the above object, according to the third aspect of the present invention, there is provided a single-pipe cylinder-type reformer according to the first and second aspects described above, further comprising a second gas flow path section with an annular cross-section, the second gas flow path section being formed outside the reforming catalyst layer packed with the reforming catalyst, communicating with the reforming catalyst layer with one end-side inlet port thereof, and allowing a gas to flow in a direction opposite to that of a gas flow in the first gas flow path section, wherein the other end-side outlet port of the second gas flow path section is arranged on an outer peripheral side near an inlet port of the pre-heat layer, and helical dividing means extending in an axial direction of the circular cylinders is formed in the second gas flow path section, for helically dividing a gas and making it flow through the second gas flow path section.

In order to achieve the above object, according to the fourth aspect of the present invention, there is provided a single-pipe cylinder-type reformer according to the first or second aspect described above, further comprising a second gas flow path section with an annular cross-section, the second gas flow path section being formed around the reforming catalyst layer packed with the reforming catalyst, communicating with the reforming catalyst layer with one end-side inlet port thereof, and allowing a gas to flow in a direction opposite to that of a gas flow in the first gas flow path section, a third gas flow path section with an annular cross-section, the third gas flow path section being formed around the second gas flow path section, communicating with the other end-side outlet port of the second gas flow path section with one end-side inlet port thereof, allowing a gas to flow in a direction opposite to that of a gas flow in the second gas flow path section, and being provided with dividing means and a CO modifying catalyst layer therein, a fourth gas flow path section with an annular cross-section, the fourth gas flow path section being formed around the third gas flow path section, communicating with the other end-side outlet port of the third gas flow path section with one end-side inlet port thereof, allowing a gas to flow in a direction opposite to that of a gas flow in the third gas flow path section, and being provided with a CO selective oxidation catalyst layer therein, and a heating channel which serves as a raw material gas flow path section formed between the third and fourth gas flow path sections, has an inlet port at one end side thereof, and allows a raw material gas in the fourth gas flow path section to flow in a direction opposite to that of a gas flow in the fourth gas flow path section and to reverse near one end of the fourth gas flow path section, and allows the raw material gas in the third gas flow path section to flow in the same direction as that of a gas flow in the fourth gas flow path section.

In order to achieve the above object, according to the fifth aspect of the present invention, there is provided a single-pipe cylinder-type reformer according to the first or second aspect described above, further comprising a second gas flow path section with an annular cross-section, the second gas flow path section being formed around the reforming catalyst layer packed with the reforming catalyst, communicating with the reforming catalyst layer with one end-side inlet port thereof, and allowing a gas to flow in a direction opposite to that of a gas flow in the first gas flow path section, a third gas flow path section with an annular cross-section, the third gas flow path section being formed around the second gas flow path section, communicating with the other end-side outlet port of the second gas flow path section with one end-side inlet port thereof, allowing a gas to flow in a direction opposite to that of a gas flow in the second gas flow path section, and being provided with a CO modifying catalyst layer therein, a fourth gas flow path section with an annular cross-section, the fourth gas flow path section being formed around the third gas flow path section, communicating with the other end-side outlet port of the third gas flow path section with one end-side inlet port thereof, allowing a gas to flow in a direction opposite to that of a gas flow in the third gas flow path section, and being provided with a CO selective oxidation catalyst layer therein, a heating channel which serves as a raw material gas flow path section formed between the third and fourth gas flow path sections, has an inlet port at one end side thereof, and allows a raw material gas in the fourth gas flow path section to flow in a direction opposite to that of a gas flow in the fourth gas flow path section and to reverse near one end of the fourth gas flow path section, and allows the raw material gas in the third gas flow path section to flow in the same direction as that of a gas flow in the fourth gas flow path section, an annular mixing chamber to be connected to an air supply pipe on an upstream side of the fourth gas flow path section, a discharge port for guiding to the mixing chamber the gas that flows into the fourth gas flow path section, an annular inflow chamber into which a reformed gas mixed with air flows through one inlet port so as to be guided to a starting terminal of the CO selective oxidation catalyst layer, and an inflow port for allowing the inflow chamber and the starting terminal of the CO selective oxidation catalyst layer to communicate with each other, wherein axial lengths of the third and fourth gas flow path sections are shorter than those of the first and second gas flow path sections, and a second CO modifying catalyst layer is formed on an upstream side of the fourth gas flow path section.

In addition to the five aspects described above, the present invention has the following several auxiliary aspects.

Helical dividing means extending in an axial direction of the circular cylinders is provided in the pre-heat layer and the reforming catalyst layer so that a gas helically flows through the first gas flow path section.

The helical dividing means is comprised of a plurality of helical fins or a plurality of helical round rods that divide the gas flow path sections into sectors in cross-sections thereof.

The dividing means formed in the second gas flow path section is comprised of a plurality of round rods that divide the second gas flow path section into sectors in a cross-section thereof.

The dividing means formed in the third gas flow path section is comprised of a plurality of fins fixed to an inner circular cylinder that forms the third gas flow path section, so as to divide the third gas flow path section into sectors in a cross-section thereof.

An outer circumferential wall of the CO selective oxidation catalyst layer is formed inside an outer circumferential wall of the fourth gas flow path section, and a space formed between the outer circumferential wall of the fourth gas flow path section and the outer circumferential wall of the CO selective oxidation catalyst layer and divided from the mixing chamber serves as a cooling flow path where a cooling fluid flows.

A dividing member is provided in the cooling flow path to divide the cooling flow path helically.

The cooling fluid to be supplied into the cooling flow path is supplied to flow in a direction opposite to a flowing direction of a gas to be supplied into the CO selective oxidation catalyst layer.

Combustion air to be combusted by the burner or an OFF gas discharged from a fuel pole of a fuel cell is used as the cooling fluid.

According to the present invention having the above aspects, the following very excellent effects can be obtained.

Since the pre-heat layer having the packing is formed in the preceding step to the reforming catalyst layer, a raw material pre-heater becomes unnecessary, agitation can be performed efficiently, and the quantity of heat consumption can be decreased.

Since the inlet port of the pre-heat layer and the outlet port of the second gas flow path section are close to each other, the temperature of the outlet port of the second gas flow path section can be decreased, and the reforming catalyst layer and the CO modifying catalyst layer can be directly connected.

Since the interiors of the pre-heat layer, reforming catalyst layer, and other gas flow path sections are helically formed by fins or the like, a uniform temperature distribution can be obtained and the heat recovery efficiency can be improved, so the temperature of the outlet port can be set to a desired value.

Since the heating channel is formed between the CO modifying catalyst layer and the CO selective oxidation catalyst layer, the reformer can be integrally formed to include the CO selective oxidation catalyst layer. Since the reaction heat of the CO modifying catalyst layer and CO selective oxidation catalyst layer can be recovered, the efficiency can be improved. Also, an undesirable side reaction can be suppressed.

Since the wall surface of the second gas flow path section and that of the CO modifying catalyst layer are formed separately and a gap is formed between them, heat insulation between these wall surfaces is improved, the recovery efficiency in the flow path section is improved, temperature increase of the CO modifying catalyst layer can be suppressed, and any heat stress acting between these wall surfaces can be avoided.

Gas and air can be uniformly mixed in the mixing chamber, so a hydrogen loss can be decreased.

Since the reforming water can be evaporated by the heating channel formed between the CO modifying catalyst layer and CO selective oxidation catalyst layer, a boiler can be formed without using a fuel. Also, a sufficiently high cooling ability for the CO modifying catalyst layer and CO selective oxidation catalyst layer can be obtained.

Since the concentration of the carbon monoxide in the reformed gas can be decreased to a predetermined value or less, the reformer can be used as a hydrogen generator for a solid-state polymer-type fuel cell, thus forming a compact, highly efficient fuel cell.

Since the gas flow path section formed of the CO modifying catalyst layer and CO selective oxidation catalyst layer is shortened to be shorter than an opposing gas flow path section, excessive temperature increase of the CO modifying catalyst layer can be prevented. Since the CO modifying catalyst layer is held at an appropriate temperature, the reaction is not interfered with.

Since the packing is packed in the pre-heat layer, heat radiation from inside the reformer is prevented to increase the heat efficiency, and the respective portions can be appropriately heat-insulated and held at appropriate temperatures.

Since the CO modifying catalyst layer is formed downstream of the flow path section, the temperature of the CO modifying catalyst layer can be increased quickly, the reaction of the CO modifying catalyst layer can be performed immediately after operation is started, and the start-up operation of the reformer can be quickened.

Since the reformed gas passing through the CO modifying catalyst layer and air can be agitated sufficiently, reaction in the CO selective oxidation catalyst layer can be performed reliably without any loss, so the hydrogen generating efficiency of the reformer can be improved.

The above and many other objects, features and advantages of the present invention will become manifest to those skilled in the art upon making reference to the following detailed description and accompanying drawings in which preferred embodiments incorporating the principle of the present invention are shown by way of illustrative examples.

DETAILED DESCRIPTION OF THE PREFERRED EMBODIMENT

A single-pipe cylinder-type reformer according to a preferred embodiment of the present invention will be described with reference to the accompanying drawings.

Figure 1:
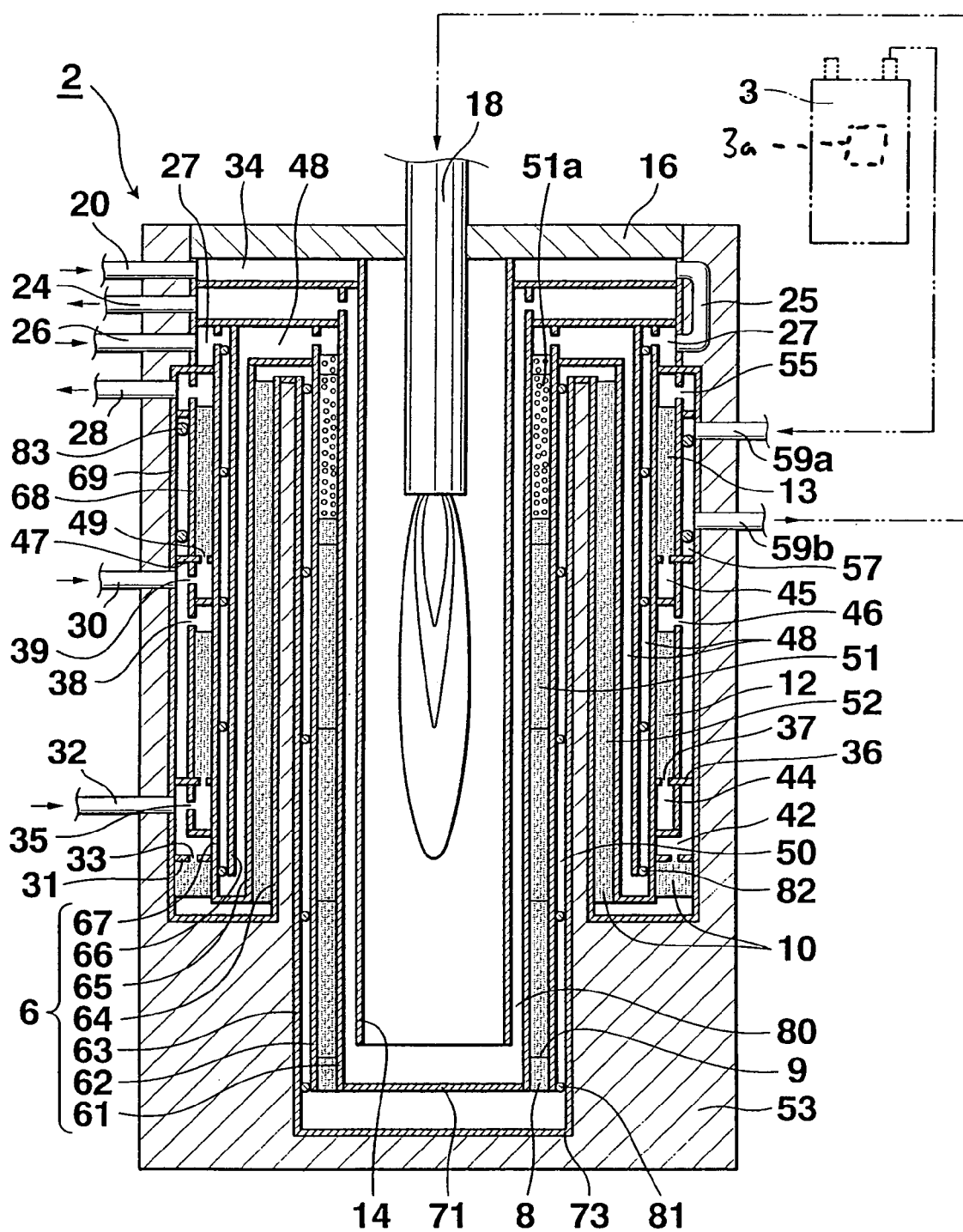
FIG. 1 is a longitudinal sectional view showing the schematic arrangement of a single-pipe cylinder-type reformer according to an embodiment of the present invention.

FIG. 1 shows the schematic arrangement of a single-pipe cylinder-type reformer. In the following description, a single-pipe cylinder-type reformer, the respective cylinders of which stand vertically and the burner of which is attached to one end (an upper portion in FIG. 1) of the reformer, as shown in FIG. 1, will be described as an example.

A reformer 2 is constituted by a plurality of circular cylinders 6 comprised of first to ninth cylinders 61 to 69 mounted coaxially, ring-shaped gaps defined between the respective cylinders, which forms a zigzag gas flow path having a plurality of gas flow path sections disposed between every pair of adjacent circular cylinders, a burner 18 mounted on the side of one end of the first cylinder 61 and at the center thereof, a reforming catalyst layer 8, CO modifying catalyst layer 10 (to be referred to also as a shift layer 10 hereinafter), and CO selective oxidation catalyst layer 12 (13)(to be referred to also as a PROX layer 12 (13) hereinafter) arranged in spaces formed by the respective cylinders and the like.

The reformer 2 has a water supply port 20, a combusted exhaust gas outlet port 24, a raw material gas supply port 26, a reformed gas outlet port 28, and PROX air supply ports 30 and 32 in its side surface.

A cylindrical heat transfer partition wall 14 (radiation cylinder) is arranged inside the first cylinder 61 to be coaxial with it while leaving an appropriate gap around and under the partition wall 14. This gap serves as an exhaust flow path 80.

The exhaust flow path 80 is connected at its upper portion to the combusted exhaust gas outlet port 24 so that the exhaust gas combusted by the burner 18 is allowed to flow to thereby be exhausted from the combusted exhaust gas outlet port 24. The burner 18 is attached inside the heat transfer partition wall 14 through a burner base 16. A water heating channel 34 communicating with the water supply port 20 is formed between the exhaust flow path 80 and burner base 16.

The water heating channel 34 is connected to a raw material gas supply path 27 through a connecting pipe 25 formed at a position opposing the supply port 20, and the supply path 27 is connected to the raw material gas supply port 26.

The relationship among the respective adjacent cylinders will be described.

Figure 2:
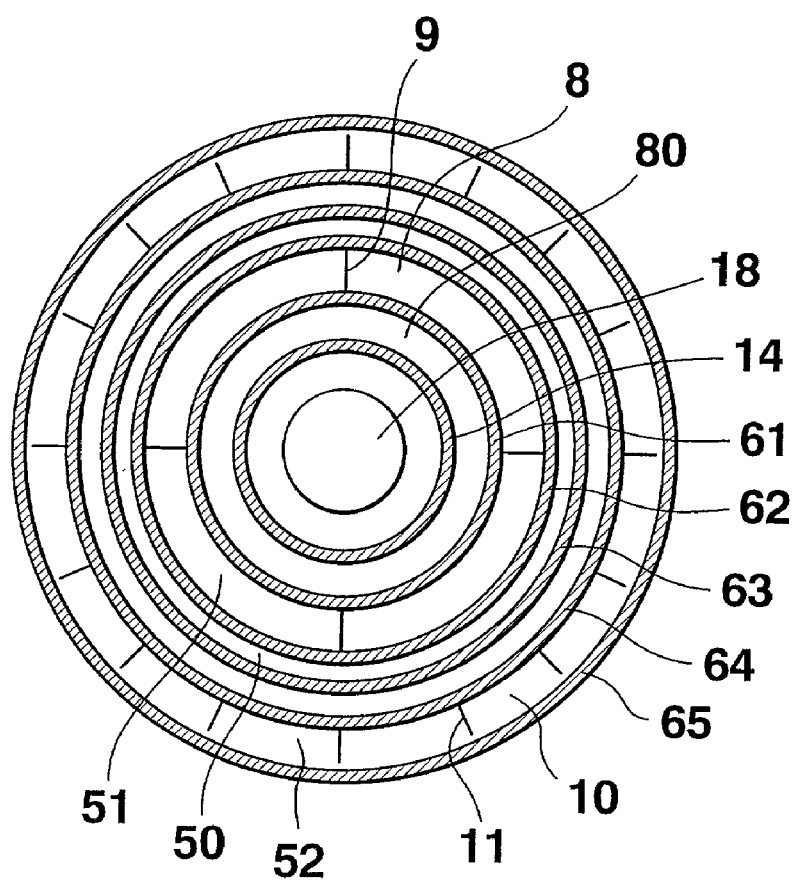
FIG. 2 is a partial cross-sectional view of the single-pipe cylinder-type reformer according to the embodiment of the present invention.
Figure 3:
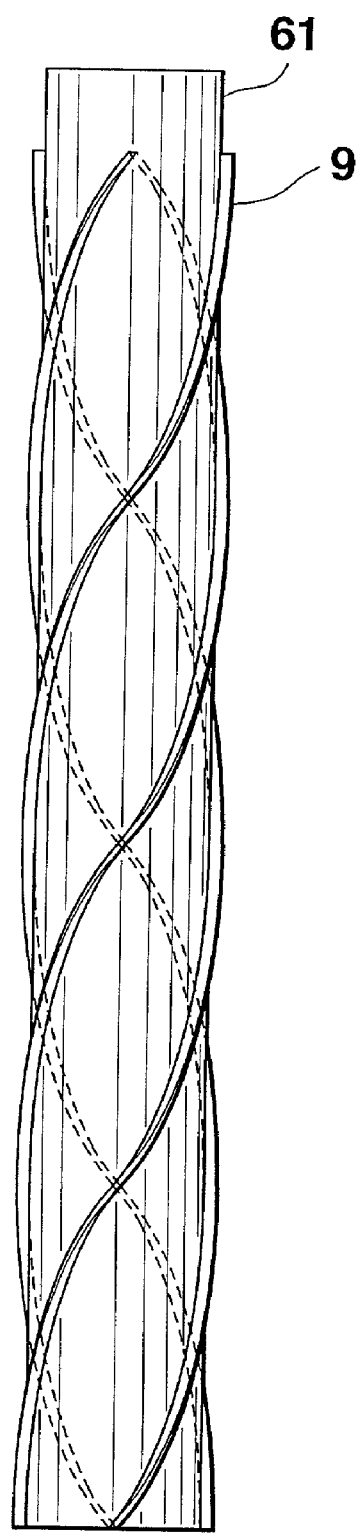
FIG. 3 is a partial side view of the single-pipe cylinder-type reformer according to the embodiment of the present invention.

A first gas flow path section 51 with a predetermined width is formed between the first and second cylinders 61 and 62. A portion above the first gas flow path section 51 is a pre-heat layer 51a, and a portion under the pre-heat layer 51a is the reforming catalyst layer 8. Four heat transfer fins 9 are provided between the first and second cylinders 61 and 62 to extend radially from the first cylinder 61 toward the second cylinder 62, so as to helically surround substantially the entire circumference of the first cylinder 61, as shown in FIG. 3. The four fins 9 helically divide the first gas flow path section 51 between the first and second cylinders 61 and 62. FIG. 2 shows a cross-sectional view. When the four fins 9 are used in this manner, four sector-like flow paths are formed. The helical fins 9 need not surround the entire circumference of the first cylinder 61. The number of fins 9 is not limited to four, but can be between about one and twenty.

The pre-heat layer 51a communicates at its upper portion with a heating channel 48 connected to the raw material gas supply path 27. A raw material gas and water (steam or the like) flow into the pre-heat layer 51a through the heating channel 48. The pre-heat layer 51a is packed with a metal packing with a high heat transfer coefficient and predetermined shape. When the gas and the like pass through the interior of the pre-heat layer 51a, the pre-heat layer 51a heats them. The fins 9 transfer the heat of the exhaust flow path 80 to the pre-heat layer 51a and swirl the gas flow in the pre-heat layer 51a so as to mix the gas efficiently.

The metal packing that is packed in the pre-heat layer 51a will be described briefly. When conventionally used ceramic balls such as alumina balls and a metal packing such as SUS are compared, the metal packing has a heat transfer performance about ten times larger than that of the ceramic balls. The heat transfer area can accordingly be decreased, so that a fuel processor such as a reformer can be downsized.

To increase the heat transfer effect of a heat fluid, the agitating effect may be increased in addition to the heat transfer performance. The more the heat gas flowing in the pre-heat chamber causes a turbulent flow, the higher the heat transfer effect becomes. For this reason, the shape of the packing to be packed in the pre-heat layer 51a varies, e.g. a saddle shape, a macaroni-like shape, and a mesh-like shape, in addition to a basic spherical shape. While the manufacturable shape of the ceramic packing is limited due to the strength, if a metal packing the shape of which is controllable is employed, a shape which has a larger surface area and can cause a turbulent flow more easily than the ceramic packing with the same area does can be obtained easily.

A large surface area can mean a large void (a space not occupied by a bulk such as a metal). Thus, the weight can be decreased accordingly, and the heat capacity of the packing can be decreased. If the heat capacity is small, the time required for heating the packing at the start-up of the reformer shortens, so the start-up performance is improved. For example, the void is 85% to 98% on the higher side, and the void of the packing used in the present invention is 96.8%. The void of the ceramic packing such as an alumina packing is about 60% to 70%.

The only drawback of the metal packing is that its material is rather expensive. Increasing the cost of material in a large plant that basically operates continuously when the metal packing is to be used is an issue, because it is less important for the large plant to improve a capability for dealing with set-up operation and load variation thereof. On the other hand, the reformer of the present invention is a home-use plant of about 1 kWe class. Therefore, it is necessary to perform a set-up/stop operation of the reformer one or two times a day, and further it is very important to improve the capability for dealing with load variation in accordance with a demand for electric power. Thus, it is very effective to adopt the material of the metal packing.

The reforming catalyst layer 8 is packed with a reforming catalyst for steam-reforming the raw material gas. The first gas flow path section 51 formed with the reforming catalyst layer 8 opens, at the lower portion of the reformer 2, to a space formed between a bottom plate 71 of the first cylinder 61 and a bottom plate 73 of the third cylinder 63. The gap between the bottom plates 71 and 73 is formed so as to allow a stress generated at the time when the cylinders 61, 62 and 63 are respectively elongated by heat. Further, it also serves as a heat-insulating layer against the flame of the burner 18.

Furthermore, the fins 9 are provided to the first gas flow path section 51 formed with the reforming catalyst layer 8, as described above. Thus, the heat of the exhaust flow path 80 is transferred to the interior of the reforming catalyst layer 8. Because of the flow paths helically formed by the fins 9, the temperature difference is small, so that a reforming reaction occurs efficiently.

A second gas flow path section 50 with a predetermined width is formed between the second and third cylinders 62 and 63, and is helically divided by four round rods 81. Hence, when the gas released from the reforming catalyst layer 8 flows through the second gas flow path section 50, its heat is transferred to the reforming catalyst layer 8 through the second cylinder 62 to heat it, and the temperature difference of the passing gas and the reforming catalyst layer 8 in the circumferential direction can be eliminated.

A gap is formed between the third and fourth cylinders 63 and 64. An insulator 53 is packed in this gap to reduce heat transfer.

A third gas flow path section 52 with a predetermined width is formed between the fourth and fifth cylinders 64 and 65. The shift layer CO(CO modifying catalyst layer) 10 packed with a Co modifying catalyst is formed in the third gas flow path section 52. A CO modifying reaction takes place in the shift layer 10. As shown in FIG. 2, sixteen fins 11 are formed in the shift layer 10 to be parallel to the axial direction. Each fin 11 is fixed to the fourth cylinder 64 and is directed to the fifth cylinder 65 with its other end, so that the internal temperature of the shift layer 10 is uniform. Alternatively, the fins 11 may be formed helically to form helical flow paths, and the number of fins 11 is not limited to sixteen.

The upper portion of the shift layer 10 communicates with the second gas flow path section 50, and the lower portion thereof communicates with the first PROX layer (CO selective oxidation catalyst layer) 12 formed between the seventh and eighth cylinders 67 and 68.

The first PROX layer 12 is packed with a CO selective oxidation catalyst, and causes an oxidation reaction that decreases the CO content to the order of ppm. The fourth cylinder 64 is connected at its lower portion to the bottom of the ninth cylinder 69. A heating channel 48 with the sixth cylinder 66 therein is formed between the fifth and seventh cylinders 65 and 67. The raw material gas supplied from the raw material gas supply port 26 and water supplied from the water supply port 20 are heated when passing through the heating channel 48, and are sent to the pre-heat layer 51*a*. Four round rods 82 are formed spatially helically in the outer flow path of the heating channel 48, to divide the flow paths such that they extend helically to surround substantially the entire circumference of the heating channel 48.

The first PROX layer 12, a second PROX layer 13, first and second mixing chambers 42 and 46 for mixing the gas and air and supplying the mixture to the first and second PROX layers 12 and 13 and the like are formed between the seventh and ninth cylinders 67 and 69. The shift layer 10 is formed, under a screen 31, in the lower portion of the space between the seventh and ninth cylinders 67 and 69. Eight discharge ports 33 are formed in the screen 31 in the circumferential direction and communicate with the first mixing chamber 42. The first mixing chamber 42 is connected to the first air supply port 32. Air is supplied to the first mixing chamber 42 through the first air supply port 32 and is mixed with the gas from the shift layer 10.

The first mixing chamber 42 communicates with a chamber 44, formed between the seventh and eighth cylinders 67 and 68, through one inlet port 35 formed in the side surface of the eighth cylinder 68. The chamber 44 is formed outside the seventh cylinder 67 in the circumferential direction, and communicates with the first PROX layer 12 through eight inflow ports 37 formed in a screen 36.

The first PROX layer 12 communicates with the second mixing chamber 46 through eight outflow ports 38 formed in the side surface of the eighth cylinder 68. The second mixing chamber 46 communicates with the second air supply port 30, and then to a chamber 45, formed between the seventh and eighth cylinders 67 and 68, through one second inlet port 39 formed in the side surface of the eighth cylinder 68. The chamber 45 is formed in the circumferential direction, and communicates with the second PROX layer 13 through eight second inflow ports 49 formed in a screen 47. The second PROX layer 13 communicates with the reformed gas outlet port 28 through eight second discharge ports 55 formed in the side surface of the eighth cylinder 68.

The number of discharge ports 33 and the like is not limited to eight. The diameters of the discharge ports 33 and the like can be changed in accordance with the distance from the hole 35 and the like, so a uniform amount of gas flows into the first mixing chamber 42 even if a pressure difference exists in it. The discharge ports 33 need not be holes but can be metal mesh-like members. The hole 35 and the like need not be one hole, but can be a plurality of small holes, and the gas may form a swirling flow or may be injected in an oblique direction in order to promote mixing.

The reformed gas outlet port 28 is connected to the fuel gas supply port of, e.g., a solid-state polymer-type fuel cell (not shown). The reformed gas (fuel gas) obtained from the reformed gas outlet port 28 and containing a predetermined concentration of hydrogen is supplied to the fuel pole 3*a* of the solid-state polymer-type fuel cell 3, so that power generation is performed. The OFF gas from the fuel pole of a solid-state electrolytic fuel cell 3 may be used as a gas to be combusted by the burner 18.

A cooling flow path 57 with an interior helically formed by round rods 83 is provided downstream from the second mixing chamber 46. Combustion air inflow and outflow ports 59*a*, 59*b* are connected to the cooling flow path 57. Combustion air enters through the inflow port 59*a* and flows out through the outflow port 59*b*. Hence, the in-flow combustion air is heated and the second PROX layer 13 is cooled.

The operation of the reformer 2 will be described.

(1) Start-Up Operation

First, reforming water is supplied through the water supply port 20, and the burner 18 is ignited to heat the interior of the reformer 2. When the interior of the reformer 2 is heated by the burner 18, radiation heat of the flame heats the heat transfer partition wall 14. The combusted exhaust gas passes between the heat transfer partition wall 14 and first cylinder 61 and is exhausted through the combusted exhaust gas outlet port 24. Thus, the inlet portion for the raw material gas to the reforming catalyst layer 8, the reforming catalyst layer 8, the pre-heat layer 51*a*, and the water heating channel 34 are heated from the inside.

After being heated to a predetermined temperature, the supplied water passes through the connecting pipe 25 and is mixed with the raw material gas supplied through the raw material gas supply port 26. The mixture flows through the heating channel 48 downward and reverses its direction at the lower portion to flow upward.

In this manner, through combustion with the burner 18, a temperature and steam necessary for start-up of the reformer 2 can be obtained within a comparatively short period of time. By passing the combusted exhaust gas of the burner 18 between the heat transfer partition wall 14 and first cylinder 61, heat contained in the combusted exhaust gas can be absorbed and discharged. Thus, the heat is utilized effectively, improving the efficiency.

The raw material gas is hydrocarbon-based fuel such as city gas. When the raw material gas is supplied through the supply port 26, it passes through the heating channel 48 between the fifth and seventh cylinders 65 and 67 together with the steam and is sent to the pre-heat layer 51*a*. Meantime, since the temperatures of the shift layer 10 and PROX layer 12 in contact with the heating channel 48 are low, the steam and raw material gas heat the shift layer 10 and PROX layer 12.

When the raw material gas enters the pre-heat layer 51*a*, as the packing that is packed in the pre-heat layer 51*a* is heated by heat from the burner 18, the raw material gas absorbs this heat and is heated to a predetermined temperature, necessary for the reforming reaction, or more, and enters the reforming catalyst layer 8. At that time, as is clearly understood, the raw material gas mixed with steam is allowed to flow within the first gas flow path section 51 in the direction from the uppermost side of the pre-heat layer 51*a* to the lowest side of the reforming catalyst layer 8 which is in reverse to the flowing direction of the combustion gas within the exhaust flow path 80. Since more raw material gas and steam with low temperatures are continuously supplied to the pre-heat layer 51*a*, the temperature of the pre-heat layer 51*a* near its inlet port can be suppressed low. When the raw material gas entering the reforming catalyst layer 8 is, e.g., methane gas, it is reformed by the following reaction:

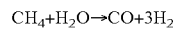

$$CH_4 + H_2O \rightarrow CO + 3H_2$$

As the reforming reaction by the reforming catalyst layer 8 is an endothermic reaction, reaction proceeds while the reforming catalyst layer 8 absorbs the combustion heat of the burner 18. More specifically, when the combusted exhaust gas of the burner 18 passes through the exhaust flow path 80 between the heat transfer partition wall 14 and reforming catalyst layer 8, heat of the combusted exhaust gas is absorbed by the reforming catalyst layer 8, and a reforming reaction takes place in the reforming catalyst layer 8 while accompanying temperature increase. When the reaction almost reaches an equilibrium, the reformed gas is released from the lower portion of the reforming catalyst layer 8, reverses its direction at the lower end, and enters the second gas flow path 50.

The round rods 81 are helically formed in the second gas flow path section 50 and the reformed gas rises helically; they perform heat exchange with the reforming catalyst layer 8 as there is no temperature difference in the circumferential direction. The upper end of the second gas flow path section 50 is in contact with the pre-heat layer 51a where the raw material gas and steam with comparatively low temperatures enter. Thus, the temperature of the gas is further decreased, so the gas is released from the upper portion of the second gas flow path section 50 at a temperature appropriate for the CO modifying reaction, is reversed in its direction, and enters the shift layer 10.

In the shift layer 10, the following CO modifying reaction takes place:

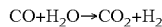

$$CO + H_2O \rightarrow CO_2 + H_2$$

Since the CO modifying reaction of the shift layer 10 is an exothermic reaction, as the reformed gas passes through the shift layer 10, its temperature increases. Meanwhile, the heating channel 48 is formed outside the shift layer 10. Thus, the temperature-increased reformed gas is cooled to reach a temperature appropriate for the selective oxidation reaction. The reformed gas released from the lower portion of the shift layer 10 is reversed in its direction at the lower end and enters the first mixing chamber 42. In the first mixing chamber 42, the reformed gas is mixed with air supplied through the first air supply port 32, and while passing through the inlet port 35 is further mixed by the orifice effect of the inlet port 35, so that a CO selective reaction is performed by the PROX catalyst layer of the first PROX layer 12.

In the first PROX layer 12, the following reaction takes place:

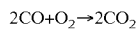

$$2CO + O_2 \rightarrow 2CO_2$$

When the reaction of the first PROX layer 12 is ended, the gas flows into the second mixing chamber 46 through the second inlet port 39 formed in the circumferential portion of the eighth cylinder 68, and is mixed with air supplied through the air supply port 30. While further passing through the second inlet port 39, the gas and air are further mixed by the orifice effect of the second inlet port 39, and the second CO selective reaction is performed by the PROX catalyst layer of the second PROX layer 13.

While air for the CO selective oxidation reaction converts CO into $CO_2$, it also oxidizes $H_2$, undesirably consuming it. In order to minimize oxidation of $H_2$, the first mixing chamber 42 is provided at the preceding stage. A minimum necessary amount of oxygen is supplied to the reformed gas so as to cause CO oxidation reaction selectively while causing reaction at a plurality of stages, e.g., in the first and second PROX layers 12 and 13.

Since the heating channel 48 is formed between the shift layer 10 and PROX layer 12, at the start-up operation, the time taken until a temperature necessary for the reaction is obtained from the heat of the steam is shortened.

(2) Stationary Operation

When the temperatures of the respective reacting portions reach a predetermined temperature so the stationary state is reached, the respective adjustment valves (not shown) are gradually opened, and water and the raw material gas are supplied through the supply ports 20 and 26. Then, water is heated by the water heating channel 34, and is evaporated in the heating channel 48 as it absorbs the reaction heat of the shift layer 10 and PROX layer 12. Therefore, the temperatures of the shift layer 10 and PROX layer 12 that undergo exothermic reaction to increase their temperatures are suppressed, and can be maintained at a predetermined value by the heat of vaporization of water.

Since the reforming water is evaporated as it is heated by the heat of the shift layer 10 and PROX layer 12 in the heating channel 48, the fuel for the burner 18 can be reduced, so that the fuel necessary for generating steam by heating can be economized. The raw material gas, together with the steam heated by the heating channel 48, enters the reforming catalyst layer 8 through the pre-heat layer 51a.

As described above, the interior of the pre-heat layer 51a has already been heated by the burner 18, and the raw material gas and steam are further heated by the pre-heat layer 51a. Thus, a pre-heater or the like need not be separately provided in order to increase the temperature of the raw material gas to a value necessary for the reforming catalyst layer 8, so the heat efficiency can be improved. Since the raw material gas is not supplied after it is heated to a high temperature in advance, the temperature near the inlet port of the pre-heat layer 51a, for example, the temperature of the outlet port of the flow path section 50, can be decreased, and the shift layer 10 where a reaction is to take place at a temperature lower than the reaction temperature of the reforming catalyst layer 8 can communicate with the reforming catalyst layer 8 through the second gas flow path section 50.

The raw material gas heated by the pre-heat layer 51a is subjected to the reforming reaction as it is further heated by the reforming catalyst layer 8, and flows out from the lower portion of the reforming catalyst layer 8. The reformed gas with a comparatively high temperature which has flowed out from the lower portion of the reforming catalyst layer 8 rises helically through the second gas flow path section 50, and is cooled down as it performs uniform heat exchange with the reforming catalyst layer 8. In other words, while the reformed gas rises swirling through the second gas flow path section 50, its heat is absorbed, and the temperature drops.

Since the pre-heat layer 51a is formed at the preceding stage of the reforming catalyst layer 8, and the inlet port of the pre-heat layer 51a and the outlet port of the second gas flow path section 50 are formed close to each other, the non-pre-heated raw material gas is introduced to the pre-heat layer 51a, so that an increase in the temperature of the pre-heat layer 51a and accordingly in the temperature of the outlet port of the second gas flow path section 50 is suppressed. Thus, the shift layer 10 can be formed continuously for the first time.

The reformed gas cooled by the second gas flow path section 50 down to a value suitable for the CO modifying reaction enters the shift layer 10 through its upper portion, and CO contained in the reformed gas is modified into carbon dioxide. Although this reaction is an exothermic reaction, the reformed gas is cooled, by heat exchange with the heating channel 48, down to a value suitable for the CO selective oxidation reaction, and then enters the subsequent PROX layer 12. At this stage, the reformed gas contains about 0.5% of CO.

As described above, the insulator 53 is packed in the gap between the second gas flow path section 50 and shift layer 10. The insulator 53 blocks heat of the second gas flow path section 50. Thus, heat of the second gas flow path section 50 is not directly transferred to heat the shift layer 10, and the temperature of the shift layer 10 can be held at the predetermined value.

Furthermore, the heating channel 48 formed around the shift layer 10 vaporizes the humid steam. This state is equivalent to integrally incorporating a boiler in the reformer 2. Heat loss of the combusted exhaust gas by the burner 18 can be reduced, and the shift layer 10 and first PROX layer 12 can be cooled by evaporation heat so that they can be suppressed to predetermined temperatures. Therefore, the degree of conversion of CO can be increased in the shift layer 10, and a methanation reaction and inverse shift reaction, which are undesirable side reactions, can be suppressed in the first PROX layer 12. Since the reaction heat and sensible heat of the shift layer 10 and first PROX layer 12 can be absorbed in this manner, the heat efficiency can be improved.

When the shift layer 10, first PROX layer 12 and the like are to be cooled, combustion air, gas or liquid reforming water, raw material gas or the like, or a combination of a plurality of members of them, may be utilized as the cooling fluid. For example, when combustion air is to be supplied to the heating channel 48, the heating channel 48 may be used as the flow path exclusively for the combustion air, or the flow path of the heating channel 48 may be divided to flow combustion air. The reforming water, raw material gas and the like may be introduced into the reformer 2 by forming flow paths separately from such combustion air flow path.

In general, a sufficiently larger cooling ability can be obtained with liquid reforming water than with gas reforming water, so that the temperature can be decreased arbitrarily. When the liquid modifying water is combined with the raw material gas, the cooling fluid inflow nozzle can serve also as the raw material gas inflow nozzle. Since the cooling fluid outflow nozzle is not necessary, the arrangement can be simplified. When the amount of steam to be supplied into the heating channel 48 is adjusted, the quantity of cooling heat in the heating channel 48 can be changed, and the temperatures of the shift layer 10, first PROX layer 12 and the like which are important in the reaction can be held at predetermined values.

The reformed gas released from the shift layer 10 enters the second and first mixing chambers 46 and 42 where it is to be mixed with air from the air supply ports 30 and 32. Since the reformed gas is mixed with air while passing through the first mixing chamber 42 and the like, it can be agitated sufficiently if a separate agitator or the like is not provided, and enters the PROX catalyst layer as it is agitated. Therefore, unnecessary hydrogen loss caused by local occurrence of a high oxygen concentration can be prevented in the reaction of the PROX catalyst layer. Since the diameter of the inlet port 35 and the like can be arbitrarily set, the reformed gas can be agitated sufficiently, so that hydrogen loss caused by excessive air can be suppressed.

After the reaction of the reformed gas by the second-stage second PROX layer 13 is ended, the reformed gas is taken out from the reformed gas outlet port 28 as a gas containing, e.g., 75% of hydrogen, 5% of methane, 19% of carbon dioxide, 1% of nitrogen, and 10 ppm or less of carbon monoxide. Since the reformed gas has a concentration of carbon monoxide of 10 ppm or less in this manner, it can be supplied to a solid-state polymer-type fuel cell, so that it can be used as a fuel gas for the solid-state polymer-type fuel cell.

Since the reformed gas passing through the shift layer 10 reliably merges with air, and since the inlet port 35 and the like are formed at only one portion, when the reformed gas passes through the inlet port 35 and the like, it is mixed with air very well. Since the reformed gas is agitated with air sufficiently in this manner and is introduced to the first PROX layer 12 and the like, the selective oxidation reaction is performed efficiently, and the consumption amount of hydrogen in the selective oxidation reaction can be minimized, so that the CO concentration can be decreased to a predetermined value or less.

In the above example, the shift layer 10 (second shift layer) is provided under the first PROX layer 12. However, the shift layer 10 need not be provided under the first PROX layer 12. The discharge ports 33 and the like are formed at eight portions almost equidistantly in the circumferential direction, and the inlet port 35 and the like are formed at one portion. However, the present invention is not limited to this arrangement, and a plurality of inlet ports may be formed when necessary.

Furthermore, the fins 9, round rods 81 and the like need not be continuous in the longitudinal direction of the reformer 2. If the fins 9, round rods 81 and the like are appropriately divided into a plurality of groups, the thermal stress can be coped with better.

What is claimed is:

1. A single pipe cylinder type reformer including a plurality of circular cylinders standing upright coaxially and forming therebetween a gas flow path allowing a raw material gas to flow therein and having a plurality of gas flow path sections, each being disposed between every pair of adjacent circular cylinders and having an annular cross-section, a radiation cylinder coaxially arranged inside the plurality of circular cylinders and forming at an outer periphery thereof an exhaust flow path, a burner arranged at one end of a center of the radiation cylinder for generating a combustion gas allowed to flow within the exhaust flow path in the reverse direction to the flowing direction of the raw material gas in a first gas flow path section, a reforming catalyst layer obtained by packing with a reforming catalyst into at least the first gas flow path section closest to the burner among the plurality of gas flow path sections, in which the raw material gas is reformed by making use of only steam, comprising:

a metal pre-heat layer packed with a metal packing at an upstream end of the reforming catalyst layer;

a second gas flow path section with an annular cross-section, the second gas flow path section being formed around the reforming catalyst layer packed with the reforming catalyst, communicating with the reforming catalyst layer with one end-side inlet port thereof, and allowing a gas to flow in a direction opposite to that of a gas flow in the first gas flow path section;

a third gas flow path section with an annular cross-section, the third gas flow path section being formed around the second gas flow path section, communicating at one end-side inlet port thereof with the other end-side outlet port of the second gas flow path section allowing a gas to flow in a direction opposite to that of a gas flow in the second gas flow path section, and being provided with a CO modifying catalyst layer therein;

a fourth gas flow path section with an annular cross-section, the fourth gas flow path section being formed around the third gas flow path section, communicating with the other end-side outlet port of the third gas flow path section with one end-side inlet port thereof, allowing a gas to flow in a direction opposite to that of a gas flow in the third gas flow path section, and being provided with a CO selective oxidation catalyst layer therein;

a heating channel which serves as a raw material gas flow path formed between the third and fourth gas flow path sections, has an inlet port at one end side thereof, and allows a raw material gas in the fourth gas flow path section to flow in a direction opposite to that of a gas flow in the fourth gas flow path section and to reverse near one end of the fourth gas flow path section, and allows the raw material gas in the third gas flow path section to flow in the same direction as that of a gas flow in the fourth gas flow path section;

an annular mixing chamber to be connected to an air supply pipe on an upstream side of the fourth gas flow path section;

a discharge port for guiding the gas that flows into the fourth gas flow path section to the mixing chamber;

an annular inflow chamber into which a reformed gas mixed with air flows through one inlet port so as to be guided to a starting terminal of the CO selective oxidation catalyst layer; and an inflow port for allowing the inflow chamber and the starting terminal of the CO selective oxidation catalyst layer to communicate with each other, wherein axial lengths of the third and fourth gas flow path sections are shorter than those of the first and second gas flow path sections, and another CO modifying catalyst layer is formed on an upstream side of the fourth gas flow path section.

2. A reformer according to claim 1, wherein helical dividing means extending in an axial direction of the circular cylinders is provided in the first gas flow path section so that a gas helically flows through the pre-heat layer and the reforming catalyst layer.

3. A reformer according to claim 2, wherein the dividing means formed in the first gas flow path section is comprised of a plurality of helical fins or a plurality of helical round rods that divide the first gas flow path section into sectors in a cross-section thereof.

4. A reformer according to claim 1, further comprising dividing means formed in the second gas flow path section is comprised of a plurality of helical round rods that divide the second gas flow path section into sectors in a cross-section thereof.

5. A reformer according to claim 1, wherein a plurality of helical fins fixed to an inner circular cylinder that forms the third gas flow path section are provided in the third gas flow path section so as to divide the third gas flow path section into sectors in a cross-section thereof.

6. A reformer according to claim 1, wherein an outer circumferential wall of the CO selective oxidation catalyst layer is formed inside an outer circumferential wall of the fourth gas flow path section, and a space formed between the outer circumferential wall of the fourth gas flow path section and the outer circumferential wall of the CO selective oxidation catalyst layer and divided from the mixing chamber serves as a cooling flow path where a cooling fluid flows.

7. A reformer according to claim 6, wherein a dividing member is provided in the cooling flow path to divide the cooling flow path helically.

8. A reformer according to claim 6, wherein the cooling fluid to be supplied into the cooling flow path is supplied to flow in a direction opposite to a flowing direction of a gas to be supplied into the CO selective oxidation catalyst layer.

9. A reformer according to claim 6, wherein combustion air to be combusted by the burner is used as the cooling fluid.

10. A reformer according to claim 5, wherein an OFF gas discharged from a fuel pole of a fuel cell is used as the cooling fluid.

11. A single-pipe cylinder type reformer including a plurality of circular cylinders standing upright coaxially and forming therebetween a gas flow path allowing a raw material gas to flow therein and having a plurality of gas flow path sections, each being disposed between every pair of adjacent circular cylinders and having an annular cross-section, a radiation cylinder coaxially arranged inside the plurality of circular cylinders and forming at an outer periphery thereof an exhaust flow path, a burner arranged at one end of a center of the radiation cylinder for generating a combustion gas allowed to flow within the exhaust flow path in the reverse direction to the flowing direction of the raw material gas in a first gas flow section, a reforming catalyst layer obtained by packing with a reforming catalyst into at least the first gas flow path section closest to the burner among the plurality of gas flow path sections, in which the raw material gas is reformed by making use of only steam, comprising:

helical dividing means extending in the first gas flow path section in an axial direction of the circular cylinders, the helical dividing means being provided within the first gas flow path section including the reforming catalyst layer for helically dividing a gas and making it flow helically through the first gas flow path section;

a second gas flow path section with an annular cross-section, the second gas flow path section being formed around the reforming catalyst layer packed with the reforming catalyst, communicating with the reforming catalyst layer with one end-side inlet port thereof, and allowing a gas to flow in a direction opposite to that of a gas flow in the first gas flow path section;

a third gas flow path section with, an annular cross-section, the third gas flow path section being formed around the second gas flow path section, communicating at one end-side inlet port thereof with the other end-side outlet port of the second gas flow path section, allowing a gas to flow in a direction opposite to that of a gas flow in the second gas flow path section, and being provided with a CO modifying catalyst layer therein;

a fourth gas flow path section with an annular cross-section, the fourth gas flow path section being formed around the third gas flow path section, communicating with the other end-side outlet port of the third gas flow path section with one end-side inlet port thereof, allowing a gas to flow in a direction opposite to that of a gas flow in the third gas flow path section, and being provided with a CO selective oxidation catalyst layer therein;

a heating channel which serves as a raw material gas flow path formed between the third and fourth gas flow path sections, has an inlet port at one end side thereof, and allows a raw material gas in the fourth gas flow path section to flow in a direction opposite to that of a gas flow in the fourth gas flow path section and to reverse near one end of the fourth gas flow path section, and allows the raw material gas in the third gas flow path section to flow in the same direction as that of a gas flow in the fourth gas flow path section;

an annular mixing chamber to be connected to an air supply pipe on an upstream side of the fourth gas flow path section;

a discharge port for guiding the gas that flows into the fourth gas flow path section to the mixing chamber;

an annular inflow chamber into which a reformed gas mixed with air flows through one inlet port so as to be guided to a starting terminal of the CO selective oxidation catalyst layer; and an inflow port for allowing the inflow chamber and the starting terminal of the CO selective oxidation catalyst layer to communicate with each other, wherein axial lengths of the third and fourth gas flow path sections are shorter than those of the first and second gas flow path sections, and another CO modifying catalyst layer is formed on an upstream side of the fourth gas flow path section.

12. A reformer according to claim 11, wherein the dividing means formed in the first gas flow path section is comprised of a plurality of helical fins or a plurality of helical round rods that divide the first gas flow path section into sectors in a cross-section thereof.

13. A reformer according to claim 11, comprising a pre-heat layer packed with a metal packing at an upstream end of the reforming catalyst layer.

14. A reformer according to claim 11, wherein the dividing means formed in the second gas flow path section is comprised of a plurality of helical round rods that divide the second gas flow path section into sectors in a cross-section thereof.

15. A reformer according to claim 11, wherein a plurality of helical fins fixed to an inner circular cylinder that forms the third gas flow path section are provided in the third gas flow path section so as to divide the third gas flow path section into sectors in a cross-section thereof.

16. A reformer according to claim 11, wherein an outer circumferential wall of the CO selective oxidation catalyst layer is formed inside an outer circumferential wall of the fourth gas flow path section, and a space formed between the outer circumferential wall of the fourth gas flow path section and the outer circumferential wall of the CO selective oxidation catalyst layer and divided from the mixing chamber serves as a cooling flow path where a cooling fluid flows.

17. A reformer according to claim 16, wherein a dividing member is provided in the cooling flow path to divide the cooling flow path helically.

18. A reformer according to claim 16, wherein the cooling fluid to be supplied into the cooling flow path is supplied to flow in a direction opposite to a flowing direction of a gas to be supplied into the CO selective oxidation catalyst layer.

19. A reformer according to claim 16, wherein combustion air to be combusted by the burner is used as the cooling fluid.

20. A reformer according to claim 11, wherein an OFF gas discharged from a fuel pole of a fuel cell is used as the cooling fluid.

* * * * *